United States Patent [19]

Hosmer

[11] E Re. 29,222

[45] Reissued May 17, 1977

[54] DISPLAY FIXTURE

[75] Inventor: Max E. Hosmer, Charlevoix, Mich.

[73] Assignee: Freedman Artcraft Engineering Corporation, Charlevoix, Mich.

[22] Filed: Jan. 12, 1976

[21] Appl. No.: 648,202

Related U.S. Patent Documents

Reissue of:

[64] Patent No.: 3,788,717
Issued: Jan. 29, 1974
Appl. No.: 273,716
Filed: July 21, 1972

[52] U.S. Cl. ..... 312/122; 312/349; 312/343

[51] Int. Cl.[2] ..... A47B 88/00; A47F 3/00

[58] Field of Search ..... 312/122, 257 R, 257 SK, 312/341, 330, 344, 343, 346, 347, 349

[56] References Cited

UNITED STATES PATENTS

| | | | |
|---|---|---|---|
| 2,320,556 | 6/1943 | Belshaw | 312/343 |
| 2,620,251 | 12/1952 | Restivo | 312/343 |
| 2,739,028 | 3/1956 | Siggia | 312/349 |
| 2,799,541 | 7/1957 | Wolters | 312/341 R |
| 3,416,850 | 12/1968 | Hilfinger et al. | 312/341 R |
| 3,574,437 | 4/1971 | Stein | 312/341 |
| 3,584,925 | 6/1971 | Himelreich | 312/343 |
| 3,716,279 | 2/1973 | Anderson et al. | 312/349 |

FOREIGN PATENTS OR APPLICATIONS

| | | | |
|---|---|---|---|
| 1,168,700 | 9/1958 | France | 312/257 SK |

*Primary Examiner*—Paul R. Gilliam
*Assistant Examiner*—Victor N. Sakran
*Attorney, Agent, or Firm*—Miller, Morriss & Pappas

[57] ABSTRACT

A display fixture is disclosed which has a rectangular metal front frame, a pair of side walls, a brace interconnecting the side walls at the rear, and a series of drawers fitted into the front frame. The drawers are supported solely from roller brackets attached to the front frame in such a manner that the drawers are cantilevered from the brackets in both the open and closed position of the drawers. The drawers each comprise a rectangular frame of extruded elements into which are fitted bottom, side, front and rear wall boards.

23 Claims, 8 Drawing Figures

DISPLAY FIXTURE

Matter enclosed in heavy brackets [ ] appears in the original patent but forms no part of this reissue specification; matter printed in italics indicates the additions made by reissue.

This invention relates to items of furniture and particularly to a hanger frame and drawer assembly which is useful in the manufacture of furniture or of drawer-type cabinets, whether of the so-called built-in type or of the furniture style.

Furniture and cabinetry generally falls into two categories; metallic and nonmetallic or wooden. The former is generally more expensive and aesthetically less pleasing in appearance so that it is used principally for industrial or office applications. The latter is more pleasing in appearance but is subject to manufacturing and use problems peculiar to wood. Specifically, it is subject to warpage and changes in dimensions.

The most common recurring problem in the manufacture of wooden cabinets or furniture is that of holding manufacturing tolerances so that the drawers fit into slideways and slide easily. This problem is particularly acute in high volume furniture manufacture, as for example, the manufacture of display fixtures, in which hundreds or even thousands of wooden parts are customarily cut and assembled in a single production run. In this type of noncustom fitted production assembly of components, dimensional errors are often cumulative with the result that the assembled product is often unacceptable because of too loose or too tight a drawer fit.

To combat this production problem, the general practice is to tighten tolerances or to custom fit drawers into cabinets. In either event the result is a more expensive item of furniture.

It has therefore been one objective of this invention to minimize or eliminate the tolerance production problem customarily encountered in nonmetallic drawer type furniture.

Another objective of this invention has been to provide an item of furniture which has all of the aesthetic advantages of nonmetallic furniture but none of the drawer and frame tolerance problems customarily encountered in this type of furniture.

Still another objective of this invention has been to provide a drawer and drawer frame subassembly which may be used in any type of traditional wooden or nonmetallic furniture and which eliminates tolerance problems customarily encountered in this type of furniture.

These objectives are accomplished and one aspect of this invention is predicated upon the concept of a metal frame to which short roller brackets are fixedly secured for the reception of cantilever-supported drawer slideways. These slideways are attached to or formed in the sides of drawers so that the frame and the drawers make up the complete front wall of the item of furniture.

This construction of front frame and drawer supports has the advantage of solving most tolerance problems commonly encountered in furniture or display fixture production. Specifically, the metal frames may be made up or assembled in a jig where very tight tolerances are inherent in the manufacturing process. Thereafter, irrespective of how the frame is mounted in its supporting structure, the drawers fit and slide easily within the frame, even if the frame is cocked or angled relative to the support.

Another advantage of this front frame and drawer subassembly technique is that it enables a display fixture to be built with a very minimum of frame elements. Specifically, since the front frame and drawers are made up as an integral front wall subassembly, all that is required to complete the fixture is to attach some form of side and top walls. In the preferred embodiment, the fixture is completed by a pair of side walls attached to the front frame, a brace between the rear of the side walls, and a display surface over the top of the side walls.

Another advantage of this front frame and drawer subassembly is that it may be used in the manufacture of built-in drawer cabinets. For example, this front frame may be mounted in the bottom of a closet or in a wall of a home to form a built-in cabinet. When the drawers are fitted into the front frame, the front exposed surface is covered and finished and the drawers fit and slide easily in the frame, irrespective of how poorly the frame is mounted on the wall.

Another aspect of this invention is predicated upon the drawer construction. Specifically in one preferred embodiment the drawer comprises a rectangular frame made from extruded metal or plastic. The extrusion is so configurated that a roller-receiving slideway is formed in the outwardly facing side walls and a side, front and rear wall board-receiving recess is formed in the extrusion. Additionally, there is a bottom flange on the extrusion which serves to support the bottom of the drawer.

This drawer construction has the advantage of minimizing or as a practical matter eliminating the problem of holding dimensional tolerances of the drawers so that they fit and slide easily with a frame. Additionally, it has the advantage of a relatively inexpensive drawer construction which by a change of the drawer front panel may be made to satisfy any number of different decorative schemes. Still another advantage of this construction is that it provides a drawer which may be easily shipped in a knocked-down or disassembled condition and then assembled in the field.

These and other objects and advantages of this invention will be more readily apparent from the following description of the drawings in which.

Figure 1:
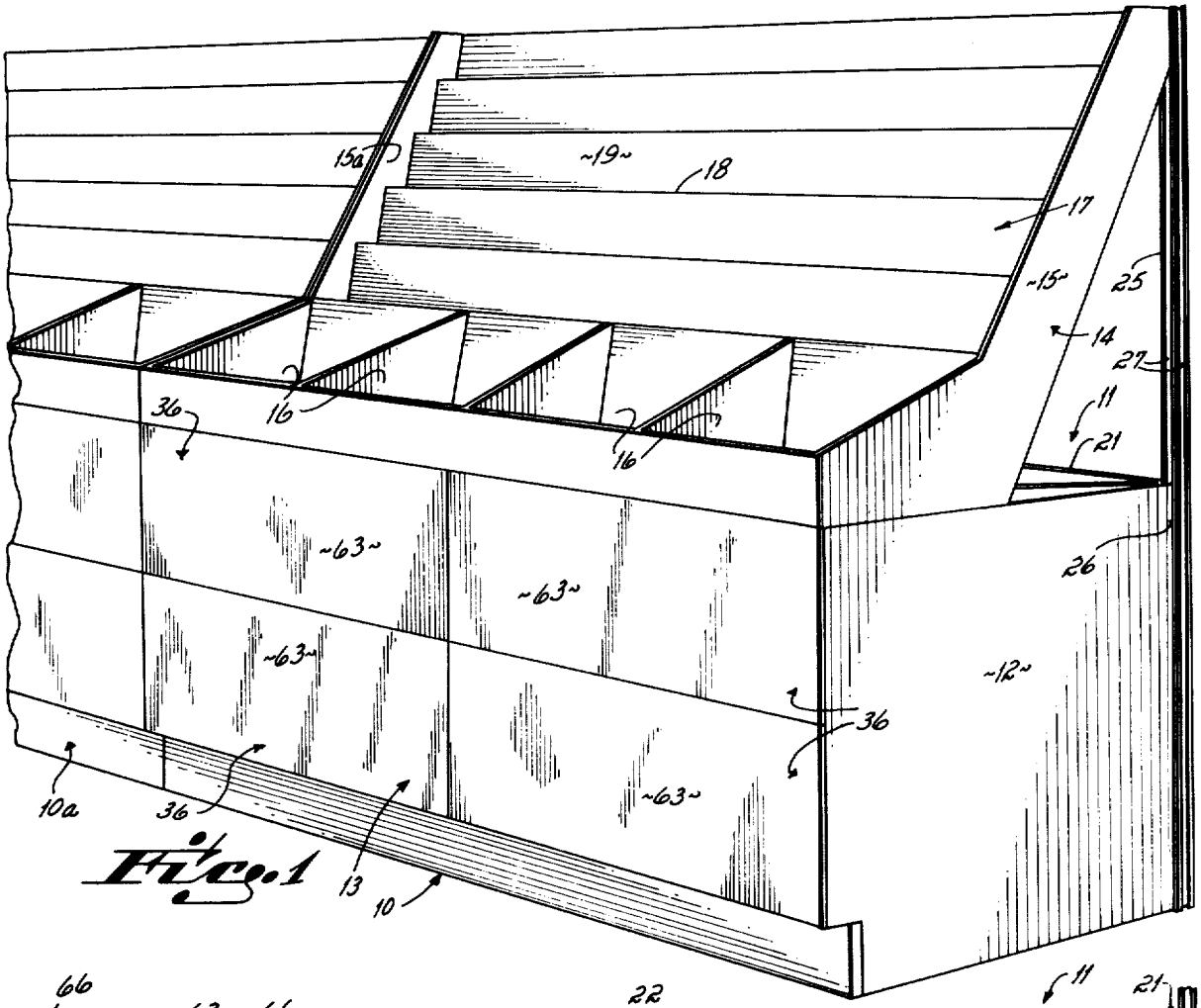
FIG. 1 is a perspective view of a display fixture incorporating the invention of this application.
Figure 3:
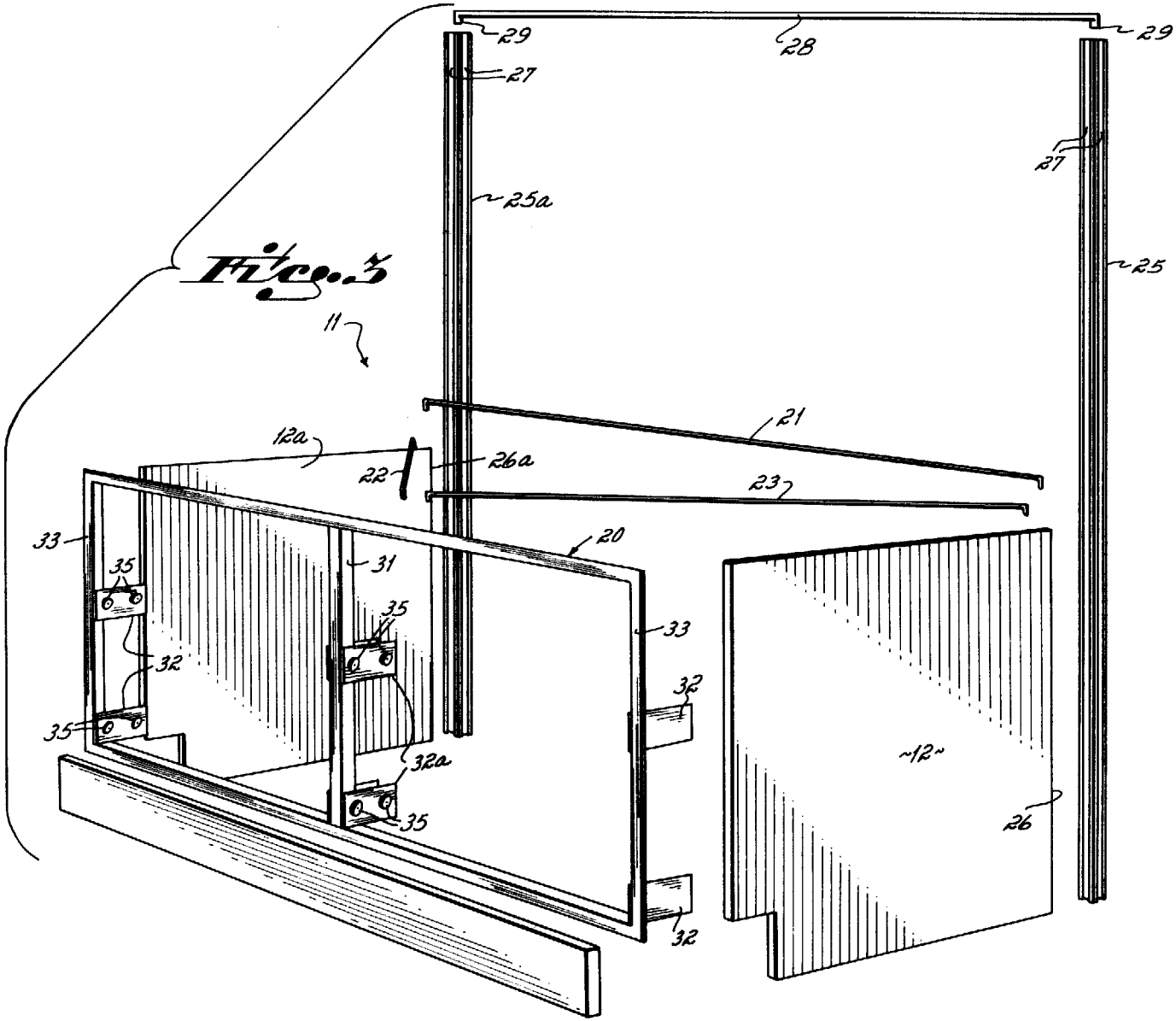
FIG. 3 is an exploded perspective view of the frame of the fixture of FIG. 1.

Referring first to FIGS. 1 and 3, there is illustrated a front perspective view of a display fixture 10 which incorporates the invention of this application. In this view a second display fixture 10a is aligned beside the first to illustrate how the fixtures are commonly used in banks or in sets for purposes of selling merchandise such as greeting cards or music records.

These display fixtures commonly comprise a frame 11 composed of a pair of side walls 12, 12a, a front wall 13, and some form of display rack or merchandise receptacle 14 mounted on top of the frame 11 of the fixture. The display rack may be in the form of an open top box mounted on top of the frame 11 or, as illustrated in the preferred embodiment, a vertically stepped rack of the type commonly used to display greeting cards. The rack illustrated in the drawings comprises a pair of side walls 15, 15a, between which there are located a series of front storage bins 16 and to the rear of these bins, a series of stepped shelves 17. These shelves comprise a series of horizontal surfaces 18 interconnected by vertical risers 19. The rack 14 per se forms no part of the invention of this application and has therefore not been illustrated in detail since it is only illustrative of one type of display surface employed in cabinets or fixtures of the type which incorporate the invention of this application.

Referring specifically to FIG. 3, there is illustrated in an exploded view the frame 11 of the fixture illustrated in FIG. 1. This frame comprises the side walls 12 and 12a of the fixture between which there is located a front rectangular metal frame 20. These side walls 12, 12a serve as the sole support for the front frame 20. To prevent inward collapse of the side walls, there is preferably a metal bar 21 which extends between the two 12, 12a and interconnects them at their rearwardmost end. Additionally, in the preferred embodiment there is a pair of cross braces 22, 23 which extend between and interconnect the rear corners of the side walls 12, 12a and the top wall of the front frame 20.

In order to support the rear wall of the display rack 14, there is a pair of vertical posts 25, 25a attached to the rearwardmost vertical edge 26, 26a of the side walls 12, 12a. In the preferred embodiment these two posts comprise hollow extruded rectangular panels which have channels 27 formed in each of the four side walls. The rearwardmost vertical edge 26 of the side walls 12 fits into one of these channels on each of the posts 25, 25a. A cross bar 28 extends between the tops of the two posts 25, 25a and interconnects them by means of a vertical stub section 29 which extends downwardly from each end of the cross bar 28 into a hollow interior (not shown) of the two posts.

In this illustrated preferred embodiment, the front frame 20 is a rectangular frame made up from angle iron which is L-shaped in cross section. This angle iron rectangular frame is divided by a vertical center post 31 which is made from a U-shaped channel. In practice, this frame 20 is assembled in a jig where the corners are welded or otherwise fixedly secured together so that the assembled frame is held to close tolerances. A pair of roller brackets 32 is welded or otherwise fixedly secured to each vertical side angle 33 of the frame in this same jig of fixture. Similarly, four brackets 32a are welded to the opposite sides of the center post 31 in the same jig so that the location of the brackets on the frame is also held to very close dimensional tolerances.

Each of the brackets 32, 32a has a pair of horizontally spaced rollers 35 rotatably secured thereon. Each pair of rollers on a bracket secured to the vertical side angles 33 of the frame 20 is located opposite and in the same horizontal plane as a pair of rollers 35 on one of the brackets 32a secured to the post 31. These opposing sets of rollers support a slideway of a drawer as is explained more fully hereinafter.

Figure 2:
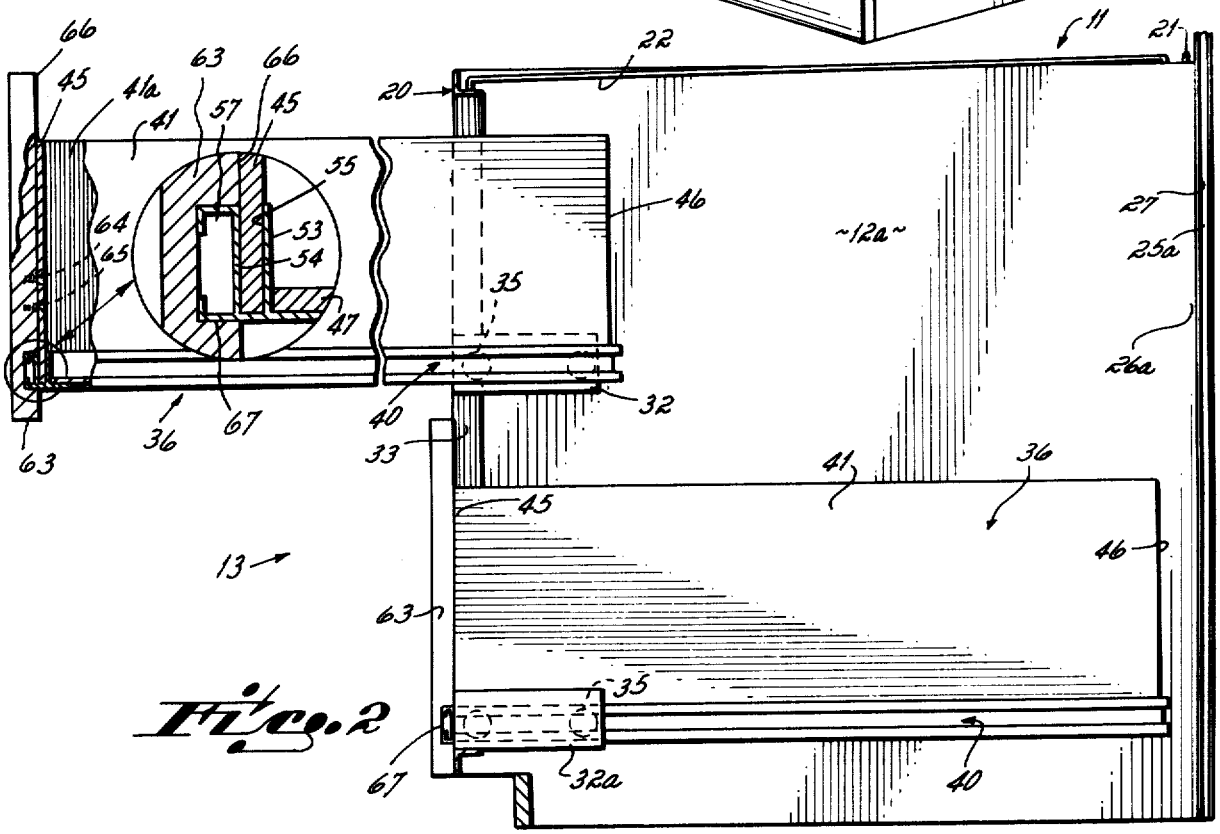
FIG. 2 is a cross sectional view through the lower portion of the fixture of FIG. 1.
Figure 4:
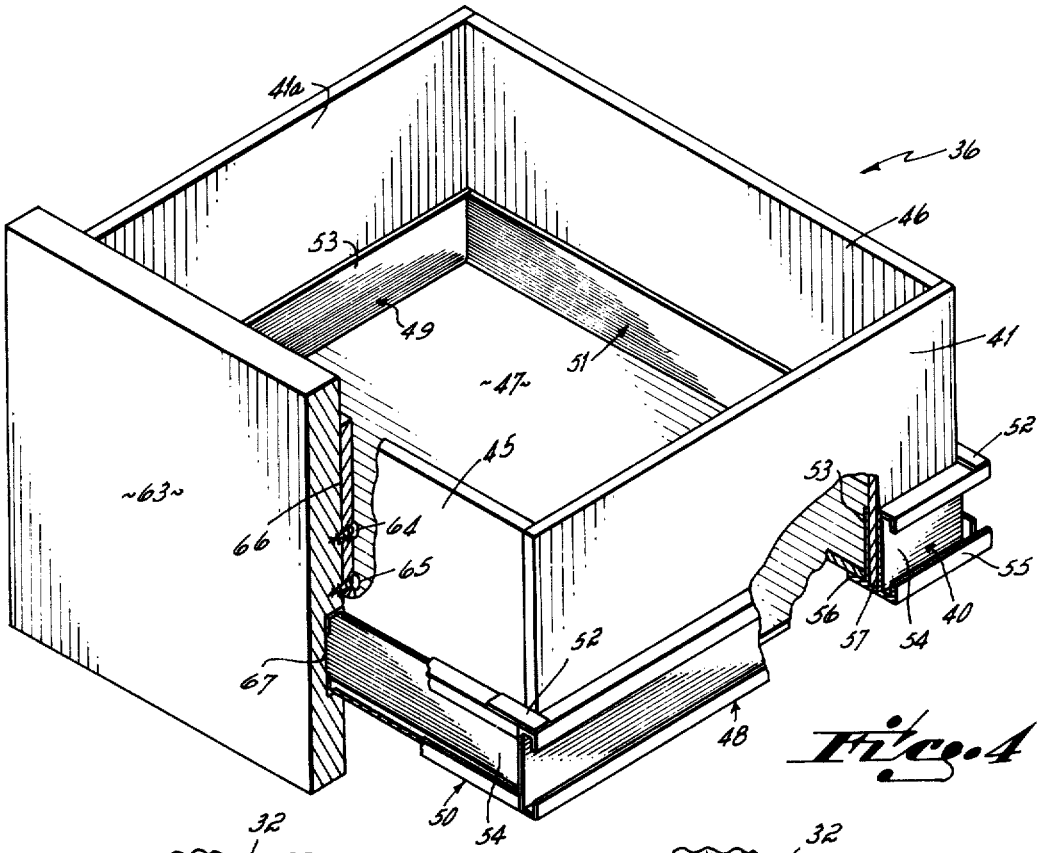
FIG. 4 is a perspective view, partially in cross section, of a drawer of the fixture of FIG. 1.

In the preferred embodiment of the invention, four drawers 36 fit within the front frame 20 and are slideable over the rollers 35 of the front frame brackets 32, 32a. Referring to FIGS. 2 and 4, it will be seen that each drawer has a channel-shaped slideway 40 formed or attached to the two side walls. These channels are generally U-shaped in cross section so that the rollers 35 may be received and entrapped within the channel 40 of each of the side walls. There are two rollers received within each channel 40 so that the drawer is supported as a cantilever when it is open or when it is closed. In FIG. 2 the uppermost one of the two drawers is in a fully open condition in which the drawer is cantilevered from adjacent its rear edge and the lower drawer is closed so that it is supported from the rollers 35 adjacent its front edge.

The primary advantage of this front frame construction is that it may be made up and assembled in a jig while being held to very close tolerances. When the frame 20 is mounted in any rigid support, as for example, between two struts of a building, the drawers may be fitted into it to form the complete front wall of a cabinet and no matter how poorly the frame is fitted within side supports the drawers will always slide easily within the frame. Additionally, the front metal frame may be used as the major component of a cabinet assembly since it is self-supporting and needs only side wall supports to hold it in a vertical plane to form a complete cabinet when the drawers are fitted into it.

Referring now to FIGS. 2 and 4, it will be seen that each of the side walls 41, 41a, the front wall 45, and the rear wall 46 of each drawer 36 includes a metal extruded section 48, 49, 50 and 51. In the illustrated embodiment these four extrusions 48, 49, 50, 51 are secured together at their corners by a metal bracket 52 so as to form a rectangular frame for the drawer. As an alternative to the corner brackets 52, the extrusions may be notched and folded to form a frame from a single long extrusion or other standard cover connectors may be used in lieu of the brackets 52.

Figure 5:
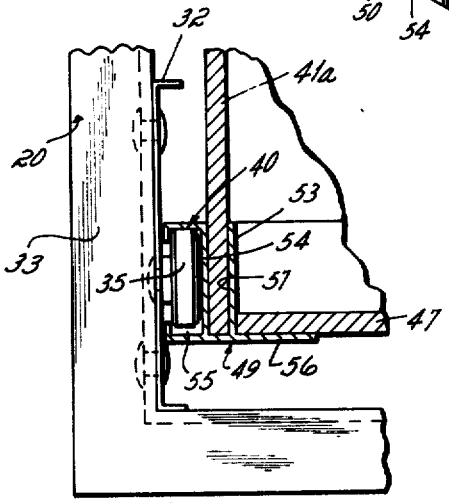
FIG. 5 is a cross sectional view through a side wall of the drawer.

Each extruded section is identical in cross section so that they may all be made in a single extrusion die. As best seen in FIG. 5, each comprises a base or bottom flange section 56 from which two vertical walls 53, 54 extend upwardly. A C-shaped channel section 55 extends outwardly from the vertical wall 54 so as to form the trackway 40 on the outer wall.

As may be seen most clearly in FIG. 2, the trackways 40 in the side wall extrusions 48 and 49 are so sized and configurated as to fit and receive the rollers 35 of the frame brackets 32, 32a. Consequently, these channels serve as the slideway for the drawer within which the rollers are rotatable for support of the drawer in its sliding movement within the frame.

The two vertical walls 53, 54 of each extrusion 48–51 define an open channel 57 into which side boards 41 and 41a are placed in the case of the side extrusions 48 and 49 and into which a front wall board 45 is placed in the case of the front extrusion panel 50. The rear wall board 46 is placed in the open slot or channel 57 of the rearwardmost extrusion 51. The side, front and rear wall boards 41, 41a, 45 and 46 may be fixedly secured on the channels by adhesive or by other securements or they may be simply retained therein by the force of gravity, depending upon the intended permanency of the installation. There is also a bottom board 47 which rests atop the base flange 56 of the four extruded sections 48, 49, 50 and 51.

A front drawer panel 63 is attached to the front wall board 45 of the drawer by conventional wooden screws 64, 65. To accommodate the channel-shaped section 55 of the front extrusion 50, the rear or inner surface 66 of the front panel 63 has a groove 67 cut into it. This groove allows the rear surface of the front drawer panel 63 to be placed in juxtaposition to the front wall surface of the front wall board 45 of the drawer.

The drawer construction described hereinbefore is particularly advantageous because it enables the drawer to be shipped in a knocked-down condition and to be easily assembled in the field. It also has the advantage of enabling the rectangular frame formed by the four extruded sections 48–51 to be preassembled at the factory in a jig so that manufacturing tolerances may be held very closely. This insures that the drawer slides easily within the front frame 20.

Figure 5A:
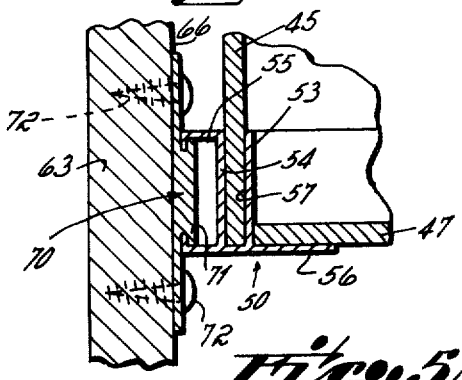
FIG. 5A is a cross sectional view through the front wall of the drawer of FIG. 5 illustrating a modified front wall mounting structure.

Referring to FIG. 5A, there is illustrated a second embodiment of drawer front mounting which may be used in lieu of the construction of FIG. 4. This second modification of drawer construction utilizes exactly the same extruded panels 48–51 to form the drawer frame. In this modification, though, the front panel 63 of the drawer is secured to the front extrusion 50 by an extruded intermediate bracket 70. This bracket or plate has a dove-tailed section 71 which fits within the channel 55 of the extrusion. The front panel 63 is secured to the intermediate extruded bracket 70 by conventional wood screws 72 and that intermediate extruded bracket is then retained within the channel 55 of the front extrusion 51 by the dove-tailed section 71 of the intermediate bracket.

Figure 6:
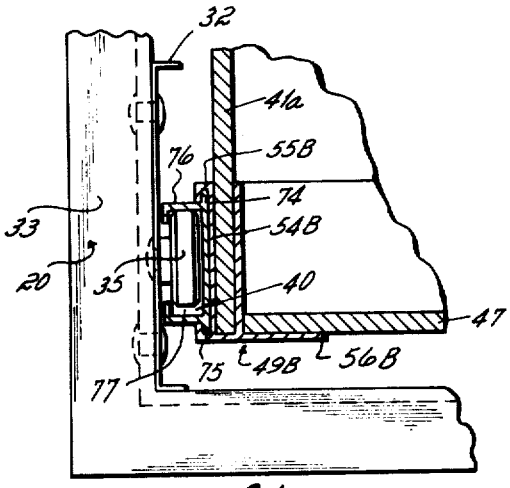
FIG. 6 is a cross sectional view through a side wall of a second modification of drawer.
Figure 6A:
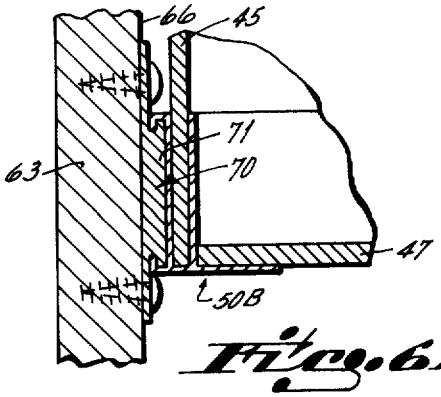
FIG. 6A is a cross sectional view through a portion of the front wall of the drawer illustrated in FIG. 6.

Referring now to FIGS. 6 and 6A, there is illustrated still another modification of a drawer embodying the invention of this application. In this modification the rectangular drawer frame is made up from two extrusions rather than a single one. Specifically, in this construction a shallow channel 55B is formed in the outer wall 54B so as to accommodate flanges 74, 75 of a C-shaped extrusion 76 which defines the roller receiving channel 77 of the drawer frame. In other words, in this modification two extrusions are utilized to form each side wall of a rectangular frame instead of a single more complex extrusion.

In the modification of FIGS. 6 and 6A the extrusion 76 is omitted from the front and rear of the drawer and the front wall panel 63 is secured onto the front panel extrusion 50B in exactly the same manner as the front wall 63 is secured onto the extrusion 50 in the modification of FIG. 5A. Specifically, the intermediate bracket 70 is secured onto the rear surface 66 of the front panel and that in turn is received within the shallow channel 55B of the extruded section 50B.

While I have described several different modifications of my invention, persons skilled in the art will appreciate changes and modifications which may be made without departing from the spirit of my invention. Specifically, the number of drawers supportable by a single frame may be varied and the drawers may be made from an extruded plastic rather than from extruded metal sections. Additionally, differing configurations of extrusions may be used to form the rectangular drawer frame just as differing bracket shapes and configurations may be utilized in the manufacture of the roller brackets of the frame 20 within which the drawer is supported. Similarly, the angle iron frame 20 may be stamped from sheet metal rather than assembled from angle sections. Therefore, I do not intend to be limited except by the scope of the following appended claims.

Having described my invention, I claim:

1. A display fixture comprising a rectangular metal front frame, said frame having top and bottom members interconnected by side members, a pair of vertically spaced slide brackets secured to each of said frame side members, each of said brackets having a pair of rollers mounted thereon, said pair of rollers of each of said brackets being located in a common horizontal plane, a pair of fixture side walls, said frame being secured to and located between said side walls adjacent the front edge thereof, a brace extending between said side walls, said brace being located rearwardly from said front frame, display means including a display surface located between said side walls and above the top of said front frame, and slideable drawers mounted within said front frame, said drawers each having a bottom wall, a front and rear wall, and a pair of side walls, said side walls each having an outwardly facing channel-defining means thereon, each of said channels being received over and slideable relative to a pair of rollers on one of said brackets, said rollers of each of said brackets being horizontally spaced so that said drawers are cantilevered from said rollers both when said drawers are fully closed within said frame or fully open relative to said frame.

2. The display fixture of claim 1 in which each of said frame members comprises an angle which is L-shaped in cross section.

3. The display fixture of claim 1 in which said drawers are supported solely from said rollers.

4. The display fixture of claim 1 in which said brace comprises a metal rod extending between said side walls.

5. The display fixture of claim 1 in which said brace comprises a metal rod extending between said side walls, said fixture further comprising a pair of metal rod braces extending between said side walls and said front frame.

6. The display fixture of claim 1 in which said display means comprises a plurality of horizontal display surfaces interconnected by vertical risers.

7. The display fixture of claim 1 in which each of the side walls of each of said drawers is formed at least in part by a horizontally extending extrusion, each of said extrusions having a horizontally extending bottom wall, a pair of channel-defining vertical walls, and a pair of outwardly facing channel-defining horizontal walls.

8. The display fixture of claim 7 in which a drawer bottom board is supported upon the top of a pair of extrusion bottom walls.

9. The display fixture of claim 7 in which a side wall board is supported between said channel-defining vertical walls of each of said side wall extrusions.

10. The display fixture of claim 1 in which each of the front, rear and side walls of each of said drawers is formed at least in part by a horizontally extending extrusion, said extrusion having a horizontally extending bottom wall, a pair of channel-defining vertical walls, and a pair of outwardly facing channel-defining horizontal walls.

11. The display fixture of claim 10 in which a drawer bottom board is supported upon the top of said extrusion bottom walls.

12. The display fixture of claim 11 in which a side wall board is supported between said channel-defining vertical walls of each of said side wall extrusions and a rear wall board is supported between said channel-defining vertical walls of each of said rear wall extrusions.

13. A display fixture comprising a rectangular front frame, said frame having top and bottom members interconnected by side members, a pair of vertically spaced slide brackets supported at least in part from each of said frame side members, a pair of fixture side walls, said frame being secured to and located between said side walls adjacent the front edge thereof, display means including a display surface located between said side walls, and drawers slideably mounted within said front frame, said drawers each having a bottom wall, a front and rear wall, and a pair of side walls, each of said side walls of each of said drawers being formed at least in part by a horizontally extending extrusion, each of said extrusions having a horizontally extending bottom flange, a pair of channel-defining vertical walls, and a pair of outwardly facing channel-defining horizontal walls, a drawer bottom board supported upon the top of said extrusion bottom flanges, and a side wall board supported between said channel-defining vertical walls of each of said side wall extrusions.

14. A display fixture comprising a rectangular front frame, said frame having top and bottom members interconnected by side members, a pair of vertically spaced slide brackets supported at least in part from each of said frame side members, a pair of fixture side walls, said frame being secured to and located between said side walls adjacent the front edge thereof, display means including a display surface located between said side walls, and drawers slideably mounted within said front frame, said drawers each having a bottom wall, a front and rear wall, and a pair of side walls, each of said front, rear and side walls of each of said drawers being formed at least in part by a horizontally extending extrusion, each of said extrusions having a horizontally extending bottom flange, a pair of channel-defining vertical walls, and a pair of outwardly facing channel-defining horizontal walls, a drawer bottom board supported upon the top of said extrusion bottom flanges, a side wall supported between said channel-defining vertical walls of each of said side wall extrusions, and a drawer rear wall board supported between said channel-defining vertical walls of said rear wall extrusion.

15. A subassembly for use in forming a drawer cabinet, said subassembly comprising a rectangular front *hanger* frame adapted to be mounted in a vertical plane, said frame having top and bottom members interconnected by side members, a pair of vertically spaced slide brackets mounted upon and supported from each of said frame side members, a pair of horizontally spaced rollers secured to each of said brackets, and slideable drawers adapted to be mounted within said front frame, said drawers each having bottom wall, a front and rear wall, and a pair of side walls, said side walls each having an outwardly facing channel-defining means thereon, each of said channels being adapted to be received over and slideable relative to the rollers on one of said brackets, said rollers of each of said brackets being horizontally spaced a distance such that said drawers are cantilevered from said rollers both when said drawers are fully closed within said frame or fully open relative to said frame.

[ 16. The subassembly of claim 15 in which each of said side walls of each of said drawers is formed at least in part by a horizontally extending extrusion, each of said extrusions having a horizontally extending bottom flange, a pair of channel-defining vertical walls, and a pair of outwardly facing channel-defining horizontal walls, a drawer bottom board supported upon the top of said extrusion bottom flanges, and a side wall board supported between said channel-defining vertical walls of each of said side wall extrusions. ]

17. The subassembly of claim 15 in which said top, bottom and side members of said front frame are sections of angle iron which are L-shaped in cross section.

18. The subassembly of claim 15 in which said front frame includes a vertical center post extending between and secured to said top and bottom members of said frame, said center post having at least four slide brackets mounted thereon, two of said four center post mounted brackets being located in the same horizontal plane and located opposite from each of said pair of frame side member mounted brackets.

*19. A subassembly for use in forming a drawer cabinet, said subassembly comprising*

*a rectangular front hanger frame adapted to be mounted in a vertical plane, said frame having top and bottom members interconnected by side members,*

*at least one slide bracket mounted upon and supported from each of said frame side members,*

*a pair of horizontally spaced rollers secured to each of said brackets, and*

*at least one slidable drawer adapted to be mounted within said front frame, said drawer having a bottom wall, a front and rear wall, and a pair of side walls, said side walls each having an outwardly facing channel-defining means thereon, each of said channels being adapted to be received over and slidable relative to the rollers on one of said brackets,*

*said rollers of each of said brackets being horizontally spaced a distance such that said drawer is cantilevered from said rollers both when said drawer is fully closed within said frame or fully open relative to said frame.*

*20. The subassembly of claim 19 in which said top, bottom and side members of said front frame are sections of angle iron which are L-shaped in cross section.*

*21. The subassembly of claim 19 in which said front frame includes a vertical center post extending between and secured to said top and bottom members of said*

*frame, said center post having at least two slide brackets mounted thereon, each of said center post mounted brackets being located in the same horizontal plane and located opposite from each of said frame side member mounted brackets.*

*22. A subassembly for use in forming a drawer cabinet, said subassembly comprising*

*a rectangular front frame adapted to be mounted in a vertical plane, said frame having top and bottom members interconnected by side members,*

*a pair of vertically spaced slide brackets mounted upon and supported from each of said frame side members,*

*a pair of horizontally spaced rollers secured to each of said brackets, and*

*slideable drawers adapted to be mounted within said front frame, said drawers each having bottom wall, a front and rear wall, and a pair of side walls, said side walls each having an outwardly facing channel-defining means thereon, each of said channels being adapted to be received over and slideable relative to the rollers on one of said brackets,*

*said rollers of each of said brackets being horizontally spaced a distance such that said drawers are cantilevered from said rollers both when said drawers are fully closed within said frame or fully open relative to said frame,*

*each of said side walls of each of said drawers is formed at least in part by a horizontally extending extrusion, each of said extrusions having a horizontally extending bottom flange, a pair of channel-defining vertical walls, and a pair of outwardly facing channel-defining horizontal walls,*

*a drawer bottom board supported upon the top of said extrusion bottom flanges, and*

*a side wall board supported between said channel-defining vertical walls of each of said side wall extrusions.*

*23. A subassembly for use in forming a drawer cabinet, said subassembly comprising*

*a rectangular front frame adapted to be mounted in a vertical plane, said frame having top and bottom members interconnected by side members,*

*at least one slide bracket mounted upon and supported from each of said frame side members,*

*a pair of horizontally spaced rollers secured to each of said brackets, and*

*at least one slidable drawer adapted to be mounted within said front frame, said drawer having a bottom wall, a front and rear wall, and a pair of side walls, said side walls each having an outwardly facing channel-defining means thereon, each of said channels being adapted to be received over and slidable relative to the rollers on one of said brackets,*

*said rollers of each of said brackets being horizontally spaced a distance such that said drawer is cantilevered from said rollers both when said drawer is fully closed within said frame or fully open relative to said frame,*

*each of said side walls of said drawer is formed at least in part by a horizontally extending extrusion, each of said extrusions having a horizontally extending bottom flange, a pair of channel defining vertical walls, and a pair of outwardly facing channel-defining horizontal walls,*

*a drawer bottom board supported upon the top of said extrusion bottom flanges, and*

*a side wall board supported between said channel-defining vertical walls on each of said wall extrusions.*

*24. The subassembly of claim 19 wherein each of said drawer side walls has an outwardly facing roller-receiving slideway formed therein, each of said slideways being adapted to be received over and slidable relative to the rollers on one of said brackets.*

* * * * *